US006656083B2

(12) United States Patent  
Esaki (10) Patent No.: US 6,656,083 B2  
(45) Date of Patent: Dec. 2, 2003

(54) HYBRID DRIVE SYSTEM (75) Inventor: Seiji Esaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/024,534

(22) Filed: Dec. 21, 2001

(65) Prior Publication Data

US 2002/0084118 A1 Jul. 4, 2002

(30) Foreign Application Priority Data

Dec. 22, 2000 (JP) ........................................ 2000-389939

(51) Int. Cl.[7] ............................................... B60K 41/02
(52) U.S. Cl. ............................. 477/5; 477/39; 477/62; 477/84
(58) Field of Search ................................ 477/5, 39, 62, 477/64, 83, 84, 167; 74/731.1

(56) References Cited

U.S. PATENT DOCUMENTS

| 5,513,732 | A | * | 5/1996 | Goates | 192/3.3 |
| 5,669,842 | A | * | 9/1997 | Schmidt | 475/5 |
| 6,090,005 | A | * | 7/2000 | Schmidt et al. | 475/5 |
| 6,269,895 | B1 | | 8/2001 | Tanuguchi et al. | |
| 6,306,057 | B1 | * | 10/2001 | Morisawa et al. | 475/5 |
| 6,328,670 | B1 | * | 12/2001 | Minowa et al. | 477/5 |
| 6,427,793 | B1 | * | 8/2002 | Hanada et al. | 180/65.2 |
| 6,490,511 | B1 | * | 12/2002 | Raftari et al. | 701/22 |

FOREIGN PATENT DOCUMENTS

| JP | 11-098601 A | 4/1999 |
| JP | 11-107798 A | 4/1999 |

* cited by examiner

Primary Examiner—Charles A. Marmor  
Assistant Examiner—David D Le  
(74) Attorney, Agent, or Firm—Nixon Peabody LLP; Donald R. Studebaker (57) ABSTRACT A hybrid drive system comprises an oil pump for forcing an operating oil to a transmission, an engine operationally connected to the oil-operated transmission through a first clutch, a battery-operated traction motor operationally connected to the transmission, a battery-operated auxiliary motor operationally connected to the engine through a second clutch so as to start the engine, an oil pump for forcing an operating oil to at least the transmission, and alteration means for selectively operationally connecting the oil pump to either one of the traction motor and the auxiliary motor which rotates at a speed of rotation higher than the other.

2 Claims, 6 Drawing Sheets

HYBRID DRIVE SYSTEM

BACKGROUND OF THE INVENTION

1. Field of the Invention

The present invention relates to a hybrid drive system for hybrid powered vehicles equipped with an oil-operated transmission.

2. Description of Related Art

Generally, vehicles are equipped with an oil pump that forces an operating oil to specific oil-operated devices such as a transmission and oil-lubricated devices such as rotating parts and sliding parts. In ordinary engine driven vehicles, this oil pump is commonly driven by an engine. In this regard, hybrid powered vehicles that are equipped with an internal combustion engine and an electric traction motor commonly use an extra driving device for the necessity of driving the oil pump even during a halt of the engine. There is disclosed in, for example, Japanese Unexamined Patent Publication No. 11-98601 one of approaches to the hybrid drive system in which an extra driving device is used to cause stable operation of auxiliary devices such as the oil pump installed in such a hybrid powered vehicle irrespective of engine operating conditions. The solution is to exclusively use an electric motor to drive auxiliary devices including an air compressor, a compressor of air conditioning system, an oil pump for a power steering system and the like, separately apart from the engine.

Incidentally, it is conceivable to use an electric motor for exclusively driving an oil pump that forces an operating oil to oil-operated devices such as a transmission and oil-lubricated parts of the hybrid powered vehicle on the basis of the teaching of the above mentioned publication.

In that case, the hybrid powered vehicle has to be equipped with an extra electric motor. This causes a cost increase of the hybrid powered vehicle. Further, this cause an increase in battery power consumption.

SUMMARY OF THE INVENTION

It is therefore an object of the present invention to provide a hybrid drive system for a hybrid powered vehicle that can always drive an oil pump with less battery power consumption irrespective of engine operating conditions and is fabricated at low costs.

The foregoing object of the present invention is accomplished by a hybrid drive system for a hybrid powered vehicle equipped with a transmission, which comprises an internal combustion engine operationally connected to the transmission through a first clutch, a battery-operated traction motor operationally connected to the transmission, a battery-operated auxiliary motor, as an engine starter, operationally connected to the engine through a second clutch, and an oil pump operative to force an operating oil to specified oil-operated and/or oil-lubricated devices and parts including at least the transmission. The oil pump is operationally connected to the auxiliary motor before the second clutch so as to be driven by the auxiliary motor whenever the auxiliary motor is driven.

The hybrid drive system that is provided with the oil pump driven by the starting motor has no necessity of having an extra motor exclusive to the oil pump.

According to the arrangement of the hybrid drive system in which the oil pump is dispose between the starting motor and the second clutch, the oil pump is always driven by the starting motor irrespective of whether the second clutch has been engaged to drive the engine for a start by the auxiliary motor or the second clutch has been disengaged after a start of the engine or a halt of the engine. Therefore, the hybrid drive system of the present invention securely forces an operating oil to the oil-operated and/or oil-lubricated devices and parts including the transmission irrespective of the states of engine.

The hybrid drive system may further comprises alteration means for operationally connecting the oil pump to the traction motor and the starting motor. That is, the alteration means operates to selectively connect the oil pump to the traction motor when an input speed of rotation to the alteration means from the traction motor is higher than an input speed of rotation to the alternation means from the starting motor and to the starting motor when an input speed of rotation to the alteration means from the traction motor is lower than an input speed of rotation to the alteration means from the starting motor. Accordingly, even while the traction motor operates in a range of lower speeds of rotation, the oil pump is driven by the auxiliary motor, so as to force a necessary amount of an operating oil to the specified devices and parts including the transmission. In addition, the hybrid drive system makes it possible to stop the starting motor while the oil pump is driven by the traction motor with an effect of stopping supply of battery power to the starting motor. This is desirable to save battery power consumption.

The alteration means comprises a first one-way clutch that disposed between the traction motor and the oil pump so as to operationally connect the oil pump to the traction motor during normal rotation of the traction motor and operationally disconnect the oil pump from the traction motor during reverse rotation of the traction motor, and a second one-way clutch disposed between the auxiliary motor and the oil pump so as to operationally connect the oil pump to the auxiliary motor during normal rotation of the auxiliary motor and operationally disconnect the oil pump from the auxiliary motor during reverse rotation of the auxiliary motor.

The hybrid drive system may further comprises an additional oil pump connected to the traction motor before the first clutch. The oil pump operationally connected to the auxiliary motor is of a high pressure-low discharge type and the additional oil pump connected to the traction motor is of a low pressure-high discharge type.

According to the hybrid drive system, even in a region where the amount of operating oil discharged by the additional oil pump driven by the traction motor is insufficient with respect to the necessary amount of operating oil for the specified oil-operated and/or oil-lubricated devices and parts including at least the transmission due, for example, to a low speed of rotation of the traction motor, the oil pump can be driven by the auxiliary motor to make up for the insufficiency. As a result, the specified oil-operated and/or oil-lubricated devices and parts are always securely provided with the necessary amount of operating oil. While, on one hand, it is common to provide the oil-operated devices such as the transmission with high pressurized operating oil at a low rate, it is also common to provide the oil-lubricated devices and parts with low pressurized operating oil at a high rate. If using a single oil pump in order to provide an necessary amount of operating oil covering all of the oil-operated and oil-lubricated devices and parts, it is essential for the oil pump to have a large capacity of discharging and pressurizing. Such the large capacity oil pump causes a large pump loss. However, according to the hybrid drive system, each of the high pressure-low discharge type oil pump and the low pressure-high discharge additional oil pump has its own region that forms a part of the entire region of operating oil supply. This realizes an oil pump system optimized in operation with respect to the necessary amount of operating oil and having less pump loses.

According to the hybrid drive system, when the vehicle is driven back, the traction motor rotates in the reverse direction. However, since the first one-way operationally clutch disconnects the oil pump from the traction motor, the oil pump does not rotate in the reverse direction. Further, at this that time, since the second one-way clutch operationally connects the oil pump to the auxiliary motor rotating in the normal direction, so that the oil pump is driven by the auxiliary motor even when the vehicle is driven back to force an operating oil to the transmission.

The hybrid drive system according to another embodiment of the present invention comprises an internal combustion engine operationally connected to the oil-operated transmission through a first clutch, a battery-operated traction motor operationally connected to the oil-operated transmission so that it is driven ordinary by a battery and can be driven by the engine to charge the battery while the traction motor is disconnected from the battery, a battery-operated auxiliary motor operationally connected to the engine through a second clutch so as to start the engine and can be driven by the engine to charge the battery while the auxiliary motor is disconnected from the battery, and an oil pump operationally connected to the traction motor so as to force an operating oil to the oil-operated transmission.

According to the hybrid drive system, the oil pump is driven directly by the traction motor that is driven by the engine while the vehicle is traveling with the aid of the engine as well as while the vehicle is traveling with the aid of the traction motor. In consequence, the oil pump is always driven to securely force an operating oil to the specified oil-operated and/or oil-lubricated devices and parts including the transmission. While the vehicle is traveling with the aid of the engine, the traction motor can be disconnected from the battery.

BRIEF DESCRIPTION OF THE DRAWINGS

The above and other objects and features of the present invention will be clearly understood from the following detailed description when read with reference to the accompanying drawings, wherein the same numeral numbers have been used to denote same or similar parts or mechanisms throughout the drawings, and in which.

DETAILED DESCRIPTION OF THE PREFERRED EMBODIMENTS

Figure 1:
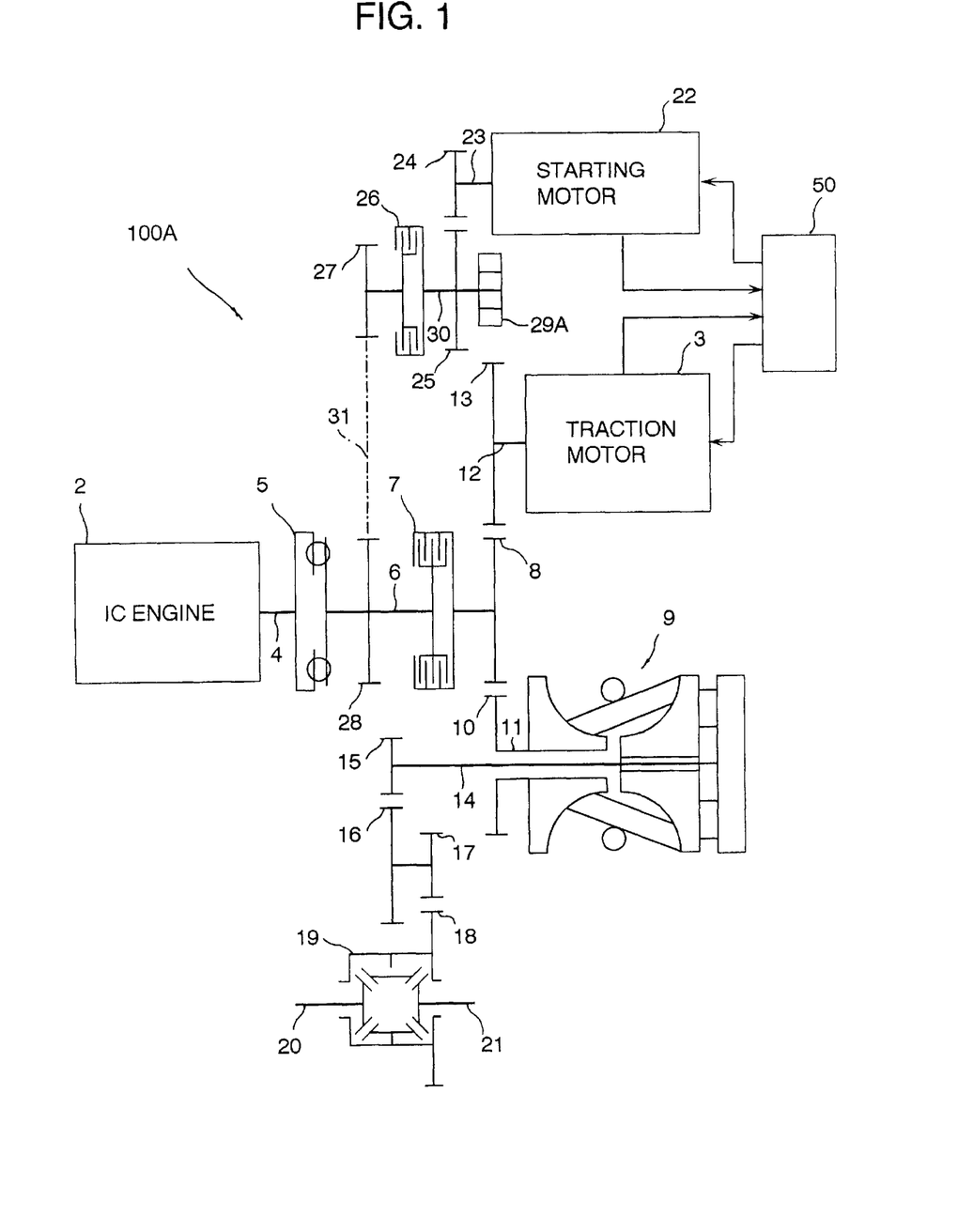
FIG. 1 is a skeleton view of a hybrid drive system in accordance with an embodiment of the present invention.

Referring to the drawings in detail and, in particular, to FIG. 1 which shows a hybrid drive system 100A for a hybrid powered vehicle according to a preferred embodiment of the present invention, the hybrid drive system 100A comprises first and second driving devices, namely an internal combustion engine (which is hereafter referred to as an engine for simplicity) 2 and a traction motor 3. The engine 2 has an engine output shaft 4 which is operationally connected to and disconnected from an input shaft 11 of a transmission 9. Specifically, the engine output shaft 4 is connected to an intermediate shaft 6 through a damper/flywheel 5. This intermediate shaft 6 is provided with a starting gear 28, a main clutch 7, which may be a conventional wet type hydraulic clutch, and a drive gear 8 fixedly mounted thereto. This drive gear 8 is in engagement with a driven gear 10 as a transmission input gear fixedly mounted to the transmission input shaft 11. The traction motor 3, which is of a reversible type and powered by a battery 50, has a motor output shaft 12 operationally connected to the transmission input shaft 11 through engagement of an output gear 13 fixed to the motor output shaft 12 with the drive gear 8 in engagement with the transmission input gear 10. The transmission 9, which may be a conventional automatic transmissions such as a toroidal continuous variable transmission and an oil-operated automatic transmission, has an output shaft 14 connected to a differential gear 19 through a gear train including a plurality of intermediate gears 15 to 18. The differential gear 19 has right and left driving axles 20 and 21 extending in opposite directions therefrom.

The hybrid system 100A further comprises an auxiliary motor 22 which is powered by the battery 50 to operate as an engine starter for starting the engine 2 and an generator that can be driven by the engine 2 to generate electricity and recharge the battery 50 with the electricity while the vehicle stops. The auxiliary motor, i.e. the starter/generator motor 22 has a motor output shaft 23 operationally connected to the engine output shaft 4. Specifically, the motor output shaft 23 is provided with an output gear 24 fixedly mounted thereto is in engagement with a first intermediate gear 25 fixedly mounted to a counter shaft 30. This counter shaft 30 in turn is provided, in addition to the first intermediate gear 25, with a starting clutch 26, which may be a wet type hydraulic clutch, and a second intermediate gear 27 fixed thereto as well. The counter shaft 30 is operationally connected to the engine output shaft 4 through a gear train 31 between the second intermediate gear 27 and the starting gear 28. The counter shaft 30 is further provided with a conventional positive displacement type of oil pump 29A directly secured thereto which forces an operating oil to specified parts and mechanisms.

In operation of the hybrid drive system 100A, when the vehicle comes to a halt after traveling, while the traction motor 3 is electrically disconnected from the battery 50, the starter/generator motor 22 remains powered by the battery 50. Therefore, the oil pump 29A is continuously driven by the starter/generator motor 22 through the output gear 24 and the first intermediate gear 25 and then forces an operating oil to the specified devices and parts including the transmission 9. When a gear is selected to a drive range to start the vehicle or while the vehicle travels at a slow speed after a start of the vehicle or before coming to a halt, the traction motor 3 is powered by the battery 50 to rotate in the normal direction. Driving torque from the traction motor 3 is transmitted to the transmission 9 through the output gear 13, the drive gear 8 and the input gear 10 between the motor output shaft 12 and the transmission input shaft 11. The transmission 9 appropriately varies and transmits incoming drive force to the differential gear 19 through the power train, i.e. the intermediate gears 15 to 18, so as to drive the right and left driving axles 20 and 21.

When the vehicle starts, the starting clutch 26 is put in, the starter/generator motor 22 is operationally connected to the engine 2. Then driving torque from the starter/generator motor 22 is transmitted to the engine 2 through the output gear 24, the first and second intermediate gears 25 and 27, the gear train 31 and the starting gear 28. When the engine 2 is driven by the starter/generator motor 22, and gains a speed of rotation necessary for the vehicle to travel at an ordinary speed, while, on one hand, the starting clutch 26 is disengaged, the main clutch 7 is put in, so as to connect the engine 2 to the transmission 9 through the engagement between the output gear 24 and the transmission input gear 10 between the engine output shaft 4 and the transmission input shaft 11. Then driving torque from the engine 2 is transmitted to the transmission 9. The transmission 9 in turn appropriately varies and transmits incoming driving torque to the transfer gear 19 through the gear train, i.e. the intermediate gears 15 to 18, so as to drive the right and left driving axles 20 and 21. That is, when a specified engine sped of rotation for an ordinary traveling speed of the vehicle is gained, the active drive source is altered from the traction motor 3 to the engine 2 and, at this time, the starting clutch 26 is disengaged to operationally disconnect the engine 2 from the starter/generator motor 22. In this instance, various auxiliary devices (not shown) such as an air conditioning compressor are possibly continuously driven by an extra motor or extra motors even while both engine 2 and traction motor 3 are in a halt during a stop of the vehicle. In that event, when the battery 50 drops in its electric power, the starting clutch 26 is put in and remained so as to restart the engine 2 with the aid of the starter/generator motor 22. After a restart of the engine 2, the starter/generator motor 22 works as a generator motor to charge the battery 50.

Further, during deceleration of the vehicle or braking the vehicle, the main clutch 7 is disengaged, then the traction motor 3 is driven by the driving axles 20 and 21 to convert kinetic energy of the vehicle to electricity and charge the battery 50 with it. In that event, the starter/generator motor 22 is continuously powered by the battery 50 to drive the oil pump 29A through the output gear 24 and the first intermediate gear 25, irrespective of whether the engine 2 is in a halt, is starting or has started. Accordingly, the oil pump 29A can be always driven to reliably force an operating oil to the specified devices and parts including the transmission 9.

Figure 2:
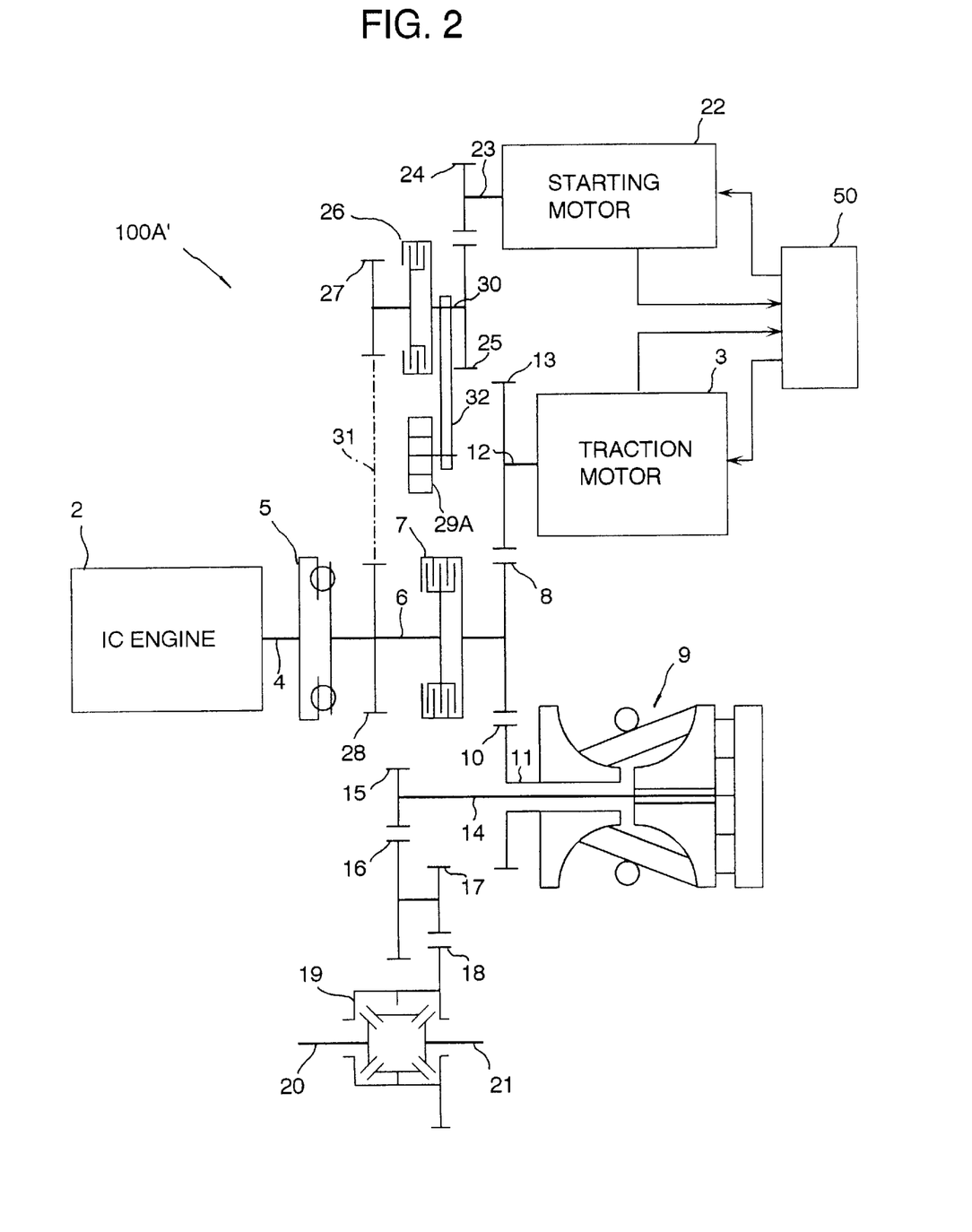
FIG. 2 is a skeleton view of a variant of the hybrid drive system shown in FIG. 1.

The oil pump 29A is not always connected directly to the counter shaft 30. For example, as shown in FIG. 2, the oil pump 29A may be coupled to the counter shaft 30 by a driving chain 32.

Figure 3:
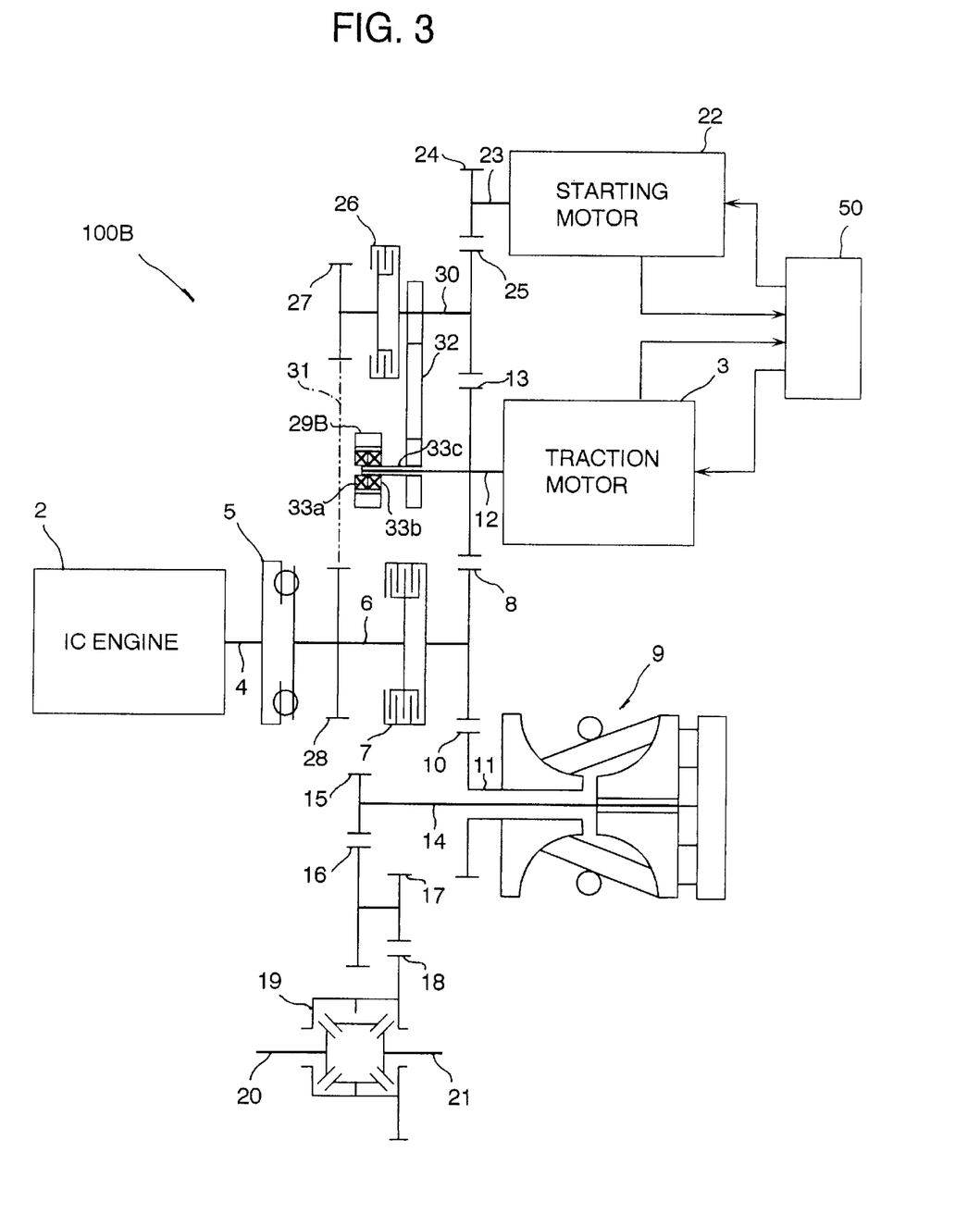
FIG. 3 is a skeleton view of a hybrid drive system in accordance with another embodiment of the present invention.

FIG. 3 shows a hybrid drive system 100B for a hybrid powered vehicle according to another preferred embodiment of the present invention. The hybrid drive system 100B comprises first and second driving devices, namely an engine 2 and a traction motor 3. The engine 2 has an engine output shaft 4 which is operationally connected to and disconnected from an input shaft 11 of a transmission 9. Specifically, the engine output shaft 4 is connected to an intermediate shaft 6 through a damper/flywheel 5. This intermediate shaft 6 is provided with a starting gear 28, a main clutch 7 and a drive gear 8 which are fixedly mounted to the intermediate shaft 6. This drive gear 8 is in engagement with a driven gear 10 as a transmission input gear fixedly mounted to the transmission input shaft 11. The traction motor 3, which is of a reversible type and powered by a battery 50, has a motor output shaft 12 connected to the transmission input shaft 11 through an output gear 13 fixedly mounted to the motor output shaft 12 in engagement with the drive gear 8. The transmission 9 has an output shaft 14 connected to a differential gear 19 through a gear train having a plurality of intermediate gears 15 to 18. The differential gear 19 has right and left driving axles 20 and 21 extending in opposite directions therefrom.

The hybrid drive system 100B further comprises an auxiliary or starter/generator motor 22 which is powered by the battery 50 to operate as an engine starter for starting the engine 2 and an generator that can be driven by the engine 2 to generate electricity and recharge the battery 50 with the electricity while the vehicle stops. The starter/generator motor 22 has a motor output shaft 23 which is operationally connected to and disconnected from the engine output shaft 4. Specifically, the motor output shaft 23 is provided with an output gear 24 fixedly mounted thereto. The output gear 24 is in engagement with a first intermediate gear 25 fixedly mounted to a counter shaft 30 and in engagement with the motor output gear 13 of the traction motor 3. This counter shaft 30 is provided, in addition to the first intermediate gear 25, with a starting clutch 26 and a second intermediate gear 27 which are fixedly connected to the counter shaft 30 as well as the first intermediate gear 25. The counter shaft 30 is operationally connected to the engine output shaft 4 through a gear train 31 between the second intermediate gear 27 and the starting gear 28.

An oil pump 29B is operationally connected the motor output shaft 12 of the traction motor 3 and to the motor output shaft 23 of the starter/generator motor 22 by way of alteration means for altering an active driving source for the oil pump 29B from one to another of the traction motor 3 and the starter/generator motor 3. The alteration means comprises, for example in this embodiment, two one-way clutches. Specifically, the oil pump 29B is provided with first and second one-way bearings 33a and 33b as the alteration means The first one-way clutch 33a is disposed between the oil pump 29B and the motor output shaft 12 of the traction motor 3 so as to lock the oil pump 29B to the motor output shaft 12 while the traction motor 3 rotates in a normal direction and unlock the oil pump 29B from the motor output shaft 12 while the traction motor 3 rotates in a reverse direction. The second one way clutch 33b is disposed between the oil pump 29B and a middle shaft 33c coupled to the counter shaft 30 by a driving chain 32 so as to lock the oil pump 29B to connecting shaft 33c while the starter/generator motor 22 rotates in a normal direction and unlock the oil pump 29B from the middle shaft 33c while the traction motor 3 rotates in a reverse direction.

When the traction motor 3 is reversed, i.e. the vehicle is driven back, the first one-way clutch 33a unlocks the oil pump 29B from the motor output shaft 12 of the traction motor 3, so that the oil pump 29B is driven by the starter/generator motor 22 rotating in the normal direction. On the other hand, when the traction motor 3 rotates in the normal direction, i.e. when the vehicle is driven forward or idles, the first one-way clutch 33a locks the oil pump 29B to the output shaft of the traction motor 3, so that the oil pump 29B is driven by either one of the traction motor 3 and the starter/generator motor 22 that is rotating at a speed of rotation higher than that of the other. For example, in the event where the starter/generator motor 22 rotates at a speed of rotation higher than that of the traction motor 3, the oil pump 29B is driven by the starter/generator motor 22 through the second one-way clutch 33b. Conversely, in the event where the traction motor 3 rotates at a speed higher than that of the starter/generator motor 22, the oil pump 29B is driven by the traction motor 3 through the first one-way clutch 33b According to the hybrid drive system 100B of this embodiment, when the vehicle is in a halt, while the traction motor 3 remains powered off, the starter/generator motor 22 is continuously driven by the battery 50. Then the oil pump 29B is locked to the middle shaft 33c and, in consequence, driven with driving torque transmitted from the starter/generator motor 22 through the output gear 24, the driving chain 32 and the second one-way clutch 33b, so as to force an operating oil to specified devices and parts such as oil-operated and oil-lubricated devices and parts including the transmission 9 while the vehicle is in a halt. In that event, the traction motor 3, that actually remains stopped, relatively rotates in the reverse direction with respect to the oil pump 29B, the first one-way clutch 33a unlocks the oil pump 29B from the motor output shaft 12 of the traction motor 3. When the vehicle is starting, the traction motor 3 is powered by the battery 50. Then driving torque from the traction motor 3 is transmitted to the transmission 9 through the output gear 13, the drive gear 8 and the input gear 10 between the traction motor output shaft 12 and the transmission input shaft 11. The transmission 9 appropriately varies and transmits incoming drive force to the differential gear 19 through the power train, i.e. the intermediate gears 15 to 18, so as to drive the right and left driving axles 20 and 21.

When the starting clutch 26 is put in after a start of the vehicle, the starter/generator motor 22 is operationally connected to the engine 2 to transmit driving torque from the starter/generator motor 22 to the engine 2 through the output gear 24, the first and second intermediate gears 25 and 27, the gear train 31 and the starting gear 28. When the engine 2 is driven by the starter/generator motor 22 and gains a speed of rotation necessary for the vehicle to travel at an ordinary speed, the main clutch 7 is put in to operationally connect the engine 2 to the transmission 9. Then driving torque from the engine 2 is transmitted to the transmission 9 through the intermediate shaft 6, the drive gear 8 and the input gear 10 between the engine output shaft 4 and the transmission input shaft 11 and appropriately varied. Subsequently, the driving torque is further transmitted to the transfer gear 19 through the gear train, i.e. the intermediate gears 15 to 18, so as to drive the right and left driving axles 20 and 21. That is, when the main clutch 7 is put in, the active drive source is altered from the traction motor 3 to the engine 2, so that the vehicle is driven by the engine 2 to travel forward. At the time the engine 2 gains the specified speed of rotation necessary for the vehicle to travel at an ordinary speed, the starting clutch 26 is disengaged to operationally disconnect the starter/generator motor 22 from the engine 2. In this instance, various auxiliary devices (not shown) such as an air conditioning compressor are possibly continuously driven by an extra motor or extra motors even while both engine 2 and traction motor 3 are in a halt during a stop of the vehicle. In that event, when the battery 50 drops in its electric power, the starting clutch 26 is put in and remained so as to restart the engine 2 with the aid of the starter/generator motor 22. After a restart of the engine 2, the starter/generator motor 22 works as a generator motor to charge the battery 50.

In addition, the traction motor 3, that is driven by the driving axles 20 and 21 during deceleration of the vehicle, converts kinetic energy of the vehicle to electricity and charge the battery with it.

Figure 4:
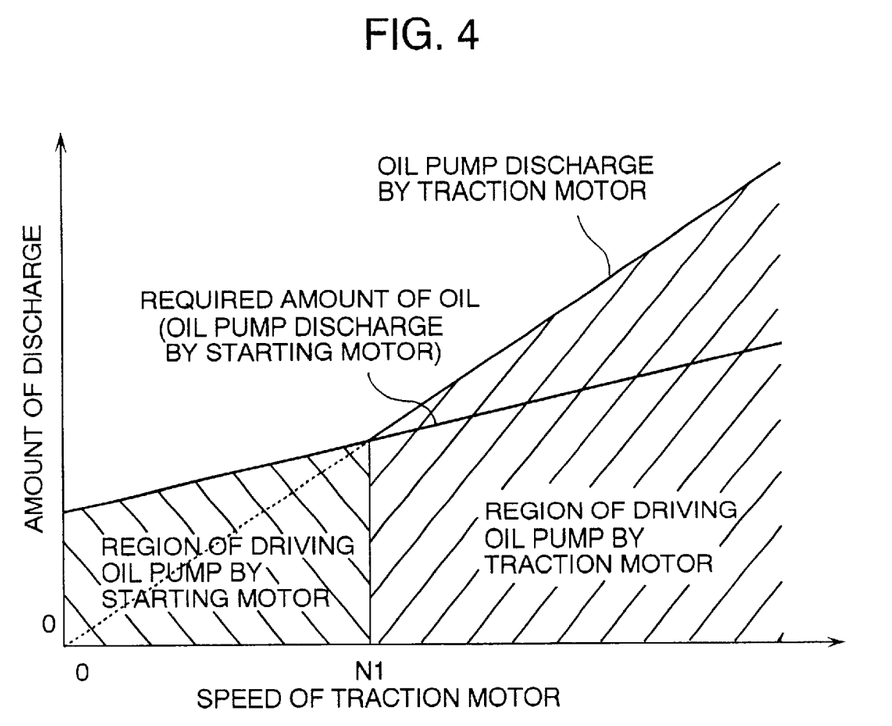
FIG. 4 is a chart showing discharge characteristics of an oil pump with respect to a speed of rotation of a traction motor when the oil pump is driven by a starter/generator motor and a traction motor.

Referring to FIG. 4 which shows an oil discharge characteristic of the oil pump 29B, i.e. an oil discharge amount of the oil pump 29B relative to a speed of rotation of the traction motor 3. As shown, while the traction motor 3 is driven at a speed of rotation lower than a specified alteration speed of rotation N1, the oil pump 29B is driven by the starter/generator motor 22 to discharge an amount of operating oil required by the specified devices and parts. On the other hand, while the traction motor 3 is driven at a speed of rotation higher than the specified alteration speed of rotation N1, the oil pump 29B is driven by the traction motor 3 to discharge an amount of operating oil greater than the required amount. The oil pump 29B is selectively operationally connected to the traction motor 3 and the starter/generator motor 22 according to relative speeds of rotation of the traction motor 3 and the starter/generator motor 22 by the aid of arrangement of the first and second one-way clutches 33a and 33b. As a result the required amount of operating oil is always secured. For example, when the traction motor 3 increases its speed of rotation above the specified alteration speed of rotation N1, the active drive source for the oil pump 29B is altered from the starter/generator motor 22 to the traction motor 3, so that the starter/generator motor 22 can be brought to a halt. As a result while the oil pump 29B is driven by the traction motor 3 to which driving torque is transmitted from the engine 2, the battery 50 can be interrupted to supply battery power to the starter/generator motor 22. This is of great advantage to the battery 50 in saving power.

When the vehicle is driven back, i.e. when the traction motor 3 rotates in the reverse direction, the one-way clutch 33a unlocks the oil pump 29B from the motor output shaft 12 of the traction motor 3 so as to disconnect the oil pump 29B from the traction motor 3, thereby preventing the oil pump 29B from being forced in the reverse direction. On the other hand, the starter/generator motor 22 remains powered by the battery 50 to rotate in the normal direction, the second one-way clutch 33b locks oil pump 29B to the middle shaft 33c, so as thereby to operationally connect the oil pump 29B to the starter/generator motor 22. As a result, the oil pump 29B is driven by the starter/generator motor 22 to force an operating oil to the specified devices and parts even while the vehicle is being driven back.

Figure 5:
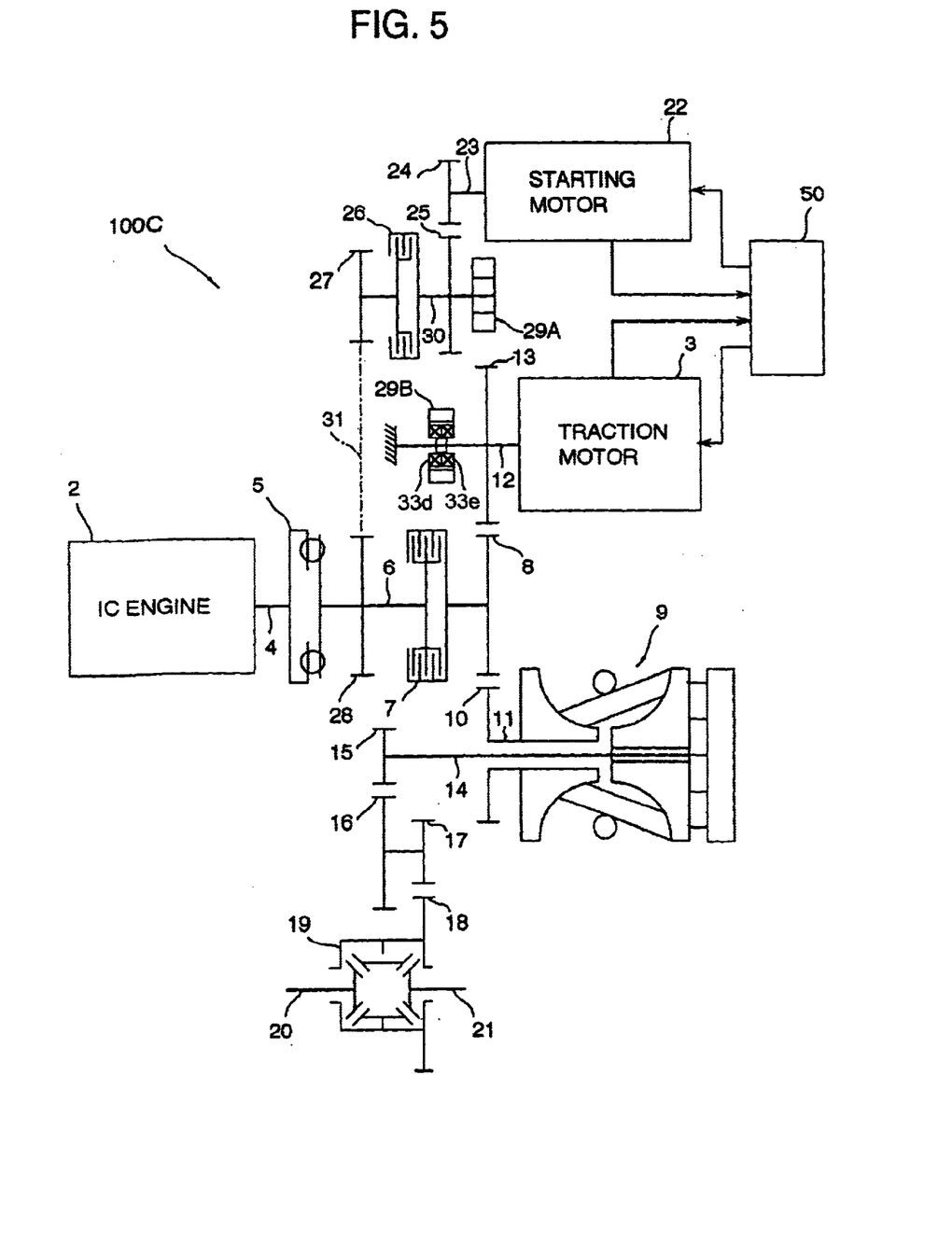
FIG. 5 is a skeleton view of a hybrid drive system in accordance with a further embodiment of the present invention.

FIG. 5 shows a hybrid drive system 100C for a hybrid powered vehicle according to a further preferred embodiment of the present invention. The hybrid drive system 100C comprises first and second driving devices, i.e. an engine 2 and a traction motor 3. The engine 2 has an engine output shaft 4 which is operationally connected to and disconnected from an input shaft 11 of a transmission 9. Specifically, the engine output shaft 4 is connected to an intermediate shaft 6 through a damper/flywheel 5. This intermediate shaft 6 is provided with a starting gear 28, a main clutch 7 and a drive gear 8 which are fixedly mounted to the intermediate shaft 6. The drive gear 8 is in engagement with a driven gear 10 as a transmission input gear fixedly mounted to the transmission input shaft 11. The traction motor 3, which is of a reversible type and powered by a battery 50, has a motor output shaft 12 connected to the transmission input shaft 11. In more detail, the motor output shaft 12 is provided with an output gear 13 fixedly mounted thereto and in engagement with the drive gear 8. The transmission 9 has an output shaft 14 connected to a differential gear 19 through a gear train having a plurality of intermediate gears 15 to 18. The differential gear 19 has right and left driving axles 20 and 21 extending in opposite directions therefrom.

The hybrid drive system 100C further comprises an auxiliary or starter/generator motor 22 which is powered by the battery 50 to operate as an engine starter for starting the engine 2 and an generator that can be driven by the engine 2 to generate electricity and recharge the battery 50 with the electricity while the vehicle stops. The starter/generator motor 22 has a motor output shaft 23 which is operationally connected to and disconnected from the engine output shaft 4. In more detail, the motor output shaft 23 is provided with an output gear 24 fixedly mounted thereto. The output gear 24 is in engagement with a first intermediate gear 25 fixedly mounted to a counter shaft 30. This counter shaft 30 is provided, in addition to the first intermediate gear 25, with a starting clutch 26 and a second intermediate gear 27 which are fixedly connected to the counter shaft 30 as well as the first intermediate gear 25. The counter shaft 30 is operationally connected to the engine output shaft 4 through a gear train 31 between the second intermediate gear 27 and the starting gear 28.

The motor output shaft 12 of the traction motor 3 is provided with a low pressure-high discharge type of first oil pump 29B, which forces an operating oil to specified devices and parts, such as oil-operated devices and oil-lubricated parts including the transmission 9. The counter shaft 30 is provided with a high pressure-low discharge type of second oil pump 29A, which forces an operating oil to the specified devices and part including the transmission 9. The first oil pump 29B is provided with first and second one-way clutches 33*d* and 33*e*. The first one-way clutch 33*d* is fixedly connected to a stationary casing 34. The second one-way clutch 33*d* is fixedly mounted on the motor output shaft 12 of the traction motor 3. The second one-way clutch 33*e* locks the first oil pump 29B to the motor output shaft 12 of the traction motor 3 while the traction motor 3 rotates in the forward direction and unlocks the first oil pump 29B from the motor output shaft 12 of the traction motor 3 while the traction motor 3 rotates in the reverse direction. The first one-way clutch 33*d* unlocks the first oil pump 29B from the stationary casing 34 while the traction motor 3 rotates in the normal direction and locks the first oil pump 29B to the stationary part 34 while the traction motor 3 rotates in the reverse direction. That is, when the traction motor 3 rotates in the normal direction, while the first one-way clutch 33*d* unlocks the oil pump 29B from the stationary casing 34, the second one-way clutch 33*e* locks the oil pump 29B to the motor output shaft 12, so that the first oil pump 29B is driven by the traction motor 3 to force an operating oil to the specified devices and parts including the transmission 9. On the other hand, when the vehicle is driven back, i.e. when the traction motor 3 rotates in the reverse direction, although the second one-way clutch 33*d* unlocks the first oil pump 29B, the first one-way clutch 33*e* locks the oil pump 29B to the stationary casing 34. In consequence, the oil pump 29B is prevented from rotating in any direction and securely remains stationary.

According to the hybrid drive system 100C of this embodiment, when the vehicle is in a halt, while the traction motor 3 remains powered off, the starter/generator motor 22 is continuously powered by the battery 50. The second oil pump 29A is driven by the starter/generator motor 22 through the output gear 24 and the first intermediate gear 25 between the motor output shaft 23 and the counter shaft 30, so as to force an operating oil to the specified devices and parts including the transmission 9. In this event, the traction motor 3 is in a halt, so that the first oil pump 29B is in a halt.

When the vehicle is starting, the traction motor 3 is powered by the battery 50. Then driving torque from the traction motor 3 is transmitted to the transmission 9 through the output gear 13, the drive gear 8 and the input gear 10 between the traction motor output shaft 12 and the transmission input shaft 11. The transmission 9 appropriately varies and transmits incoming driving torque to the differential gear 19 through the power train, i.e. the intermediate gears 15 to 18, so as to drive the right and left driving axles 20 and 21. When the starting clutch 26 is put in after the start of the vehicle by the traction motor 3, the starter/generator motor 22 is operationally connected to the engine 2, so that driving torque from the starter/generator motor 22 is transmitted to the engine 2 through the output gear 24, the first and second intermediate gears 25 and 27, the gear train 31 and the starting gear 28 between the starting motor output shaft 23 and the engine output shaft 4. When the engine 2 is driven by the starter/generator motor 22 and gains the specified speed of rotation, the main clutch 7 is put in to operationally connect the engine 2 to the transmission 9. Then driving torque from the engine 2 is transmitted to the transmission 9 through the intermediate shaft 6, the drive gear 8 and the input gear 10 between the engine output shaft 4 and the transmission input shaft 11. The transmission 9 appropriately varies and transmits incoming driving torque to the transfer gear 19 through the gear train, i.e. the intermediate gears 15 to 18, so as to drive the right and left driving axles 20 and 21. That is, when the main clutch 7 is put in, the active drive source is altered from the traction motor 3 to the engine 2 and then the vehicle travels forward. Upon an occurrence of the specified engine speed of rotation, the starting clutch 26 is disengaged to operationally disconnect the engine 2 from the starter/generator motor 22. In this instance, various auxiliary devices (not shown) such as an air conditioning compressor are possibly continuously driven by an extra motor or extra motors even while both engine 2 and traction motor 3 are in a halt during a stop of the vehicle. In that event, when the battery 50 drops in its electric power, the starting clutch 26 is put in and remained so as to restart the engine 2 with the aid of the starter/generator motor 22. After a restart of the engine 2, the starter/generator motor 22 works as a generator motor to charge the battery 50.

In addition, the traction motor 3, that is driven by the driving axles 20 and 21 during deceleration of the vehicle, converts kinetic energy of the vehicle to electricity and charge the battery with the electricity.

Figure 6:
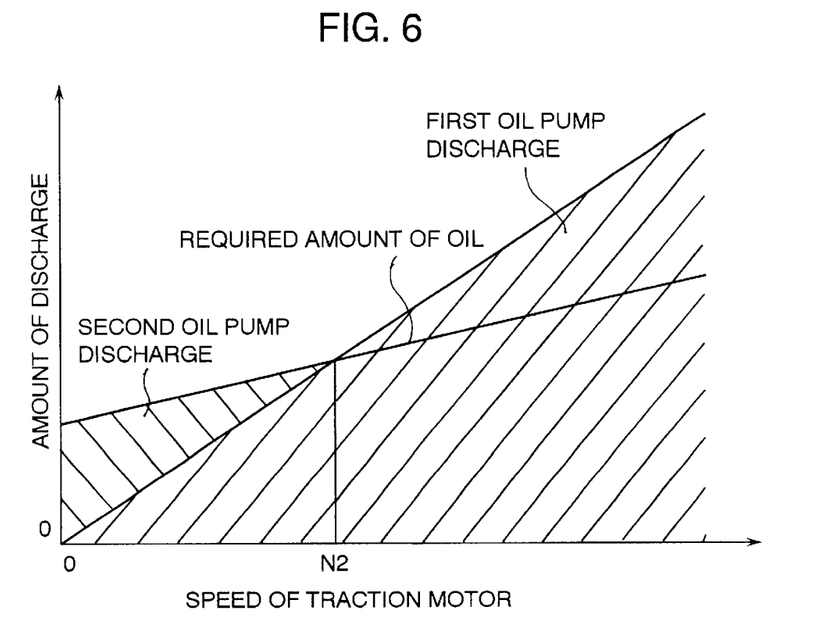
FIG. 6 is a chart showing discharge characteristics of first and second oil pumps with respect to a speed of rotation of a traction motor.

Referring to FIG. 6 which shows oil discharge characteristics of the first and second oil pumps 29B and 29A, i.e. an oil discharge amounts of the first and second oil pumps 29B and 29A relative to speed of rotation of the traction motor 3. As shown, while the traction motor 3 is driven at a speed of rotation lower than a specified alteration speed of rotation N2, the amount of operating oil that the first oil pump 29B driven by the traction motor 3 discharges is less than an amount of operating oil required by the specified parts and mechanisms. In this event, the second oil pump 29A is driven by the starter/generator motor 22 so as to make up for the insufficiency. On the other hand, while the traction motor 3 is driven at a speed of rotation higher than the specified alteration speed of rotation N2, the first oil pump 29B is driven by the traction motor 3 to discharge and deliver an amount of operating oil greater than the required amount to the specified devices and parts. Accordingly, the required amount of operating oil that is to be delivered to the specified parts is secured by driving, selectively or in combination, the motors 3 and 22 by which the first and second oil pumps 29B and 29A are driven, before and after the specified alteration speed of rotation. For example, when the traction motor 3 is driven at a speed of rotation lower than the specified alteration speed of rotation N2, both traction motor 3 and starter/generator motor 22 are used in combination to drive the first and second oil pumps 29B and 29A so as thereby to securely provide the necessary amount of operating oil. On the other hand, when the traction motor 3 raises its speed of rotation above the specified alteration speed of rotation N2, then, while the starter/generator motor 22 is selectively interrupted to bring a halt to the second oil pump 29A, the traction motor 3 is continuously used to drive the first oil pump 29B so as thereby to provide a sufficient amount of operating oil that is greater than the required amount. In consequence, while the starter/generator motor 22 remains in a halt, the battery is prevented from wasting electric power.

Figure 7:
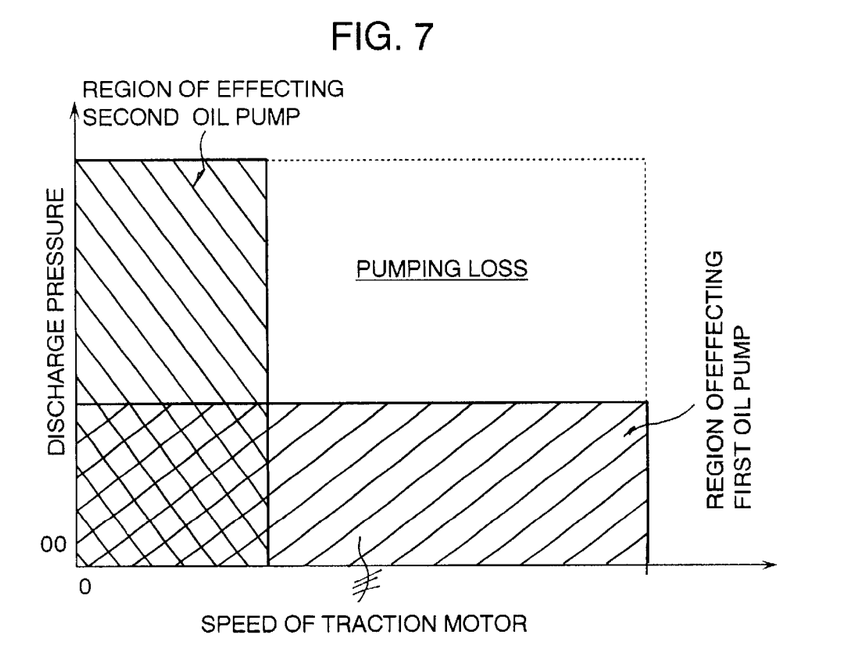
FIG. 7 is a chart showing discharge characteristics of first and second oil pumps for the purpose of explaining a pump loss.

Ordinarily, while, on one hand, there is a need for the transmission 9 to be supplied with a small amount of high pressurized operating oil, there is a need for the sliding parts to be supplied with a large amount of low pressurized operating oil. In order to provide an necessary amount of operating oil covering all of the specified devices and parts by a single oil pump, it is essential for the oil pump to have large discharge and high discharge pressure as shown by a chained line in FIG. 7. Such the large capacity oil pump causes a large pump loss. According to the hybrid drive system shown in FIG. 5, as shown in FIG. 7, the first and second oil pumps 29B and 29A have their own allotted covering regions. That is, the first oil pump 29B, that is of a low pressure-high discharge type, covers a lower pressure region over a possibly necessary extent of discharge, and the second oil pump 29A, that is of a high pressure-low discharge type, covers a smaller discharge region over a possibly necessary extent of pressure. This avoids the use of a large capacity of oil pump in realizing an oil pumping system which causes only a less pump loss.

When the vehicle is driven back, i.e. when the traction motor 3 rotates in the reverse direction, while the second one-way clutch 33d unlocks the first oil pump 29B from the motor output shaft 12 of the traction motor 3, the first one-way clutch 33c locks the first oil pump 29B to the stationary casing 34, so that the first oil pump 29B is prevented from being driven in the reverse direction and held stationary. On the other hand, the second oil pump 29A is driven by the starter/generator motor 22 to force an operating oil to the specified devices and parts.

In the above embodiments, the transmission 9 may be a toroidal type of continuously variable transmission or an ordinary type of automatic transmission.

As described above, the hybrid drive system of the present invention, the oil pump is always driven by the auxiliary motor that is always driven by the battery during a halt of the engine, or is driven by the auxiliary motor or, after a start of the engine, by either one or both of the auxiliary motor and the traction motor that is driven by the engine, so that an operating oil is always forced to the specified oil-operated and oil-lubricated devices and parts. This realizes the hybrid drive system that can operate with decreased power consumption and is fabricate at low costs.

Although the present invention has been described with reference to specific embodiments, it is to be understood that various variants and other embodiments will be apparent to those of ordinary skill in the art without departing from the spirit and scope of the invention defined in the following claims.

What is claimed is:

1. A hybrid drive system for a hybrid powered vehicle equipped with an oil-operated transmission, said hybrid drive system comprising:

an internal combustion engine operationally connected to said oil-operated transmission through a first clutch;

a battery-operated traction motor operationally connected to the oil-operated transmission;

a battery-operated auxiliary motor operationally connected to said engine through a second clutch so as to start the engine;

an oil pump operative to force an operating oil to at least the oil-operated transmission, said oil pump being operationally connected to said battery-operated auxiliary motor before said second clutch so as to be able to be driven by said battery-operated auxiliary motor; and alteration means for operationally connecting said oil pump to said battery-operated traction motor when a speed of rotation input from said battery-operated traction motor is higher than a speed of rotation input from said battery-operated auxiliary motor and to said battery-operated auxiliary motor when said speed of rotation from said battery-operated traction motor is lower than said speed of rotation from said battery-operated auxiliary motor, said alteration means comprising a first one-way clutch disposed between said battery-operated traction motor and said oil pump so as to connect said oil pump to said battery-operated traction motor during normal rotation of said battery-operated traction motor only and a second one-way clutch disposed between said battery operated auxiliary motor and said oil pump so as to connect said oil pump to said battery-operated auxiliary motor during normal rotation of said battery-operated auxiliary motor only.

2. A hybrid drive system as defined in claim 1, wherein, when a battery drops its electric power to a specified charged condition while the vehicle stops, said second clutch is put in to connect said battery-operated auxiliary motor to said engine to start said engine so as thereby to charge said battery through said battery-operated auxiliary motor.

* * * * *